(12) United States Patent
Mednik et al.

(10) Patent No.: US 7,538,534 B2
(45) Date of Patent: May 26, 2009

(54) METHOD AND APPARATUS FOR CONTROLLING OUTPUT CURRENT OF A CASCADED DC/DC CONVERTER

(75) Inventors: Alexander Mednik, Campbell, CA (US); Rohit Tirumala, Madison, WI (US)

(73) Assignee: Supertex, Inc., Sunnyvale, CA (US)

( * ) Notice: Subject to any disclaimer, the term of this patent is extended or adjusted under 35 U.S.C. 154(b) by 298 days.

(21) Appl. No.: 11/187,780

(22) Filed: Jul. 20, 2005

(65) Prior Publication Data
US 2006/0113975 A1 Jun. 1, 2006

Related U.S. Application Data

(60) Provisional application No. 60/631,514, filed on Nov. 29, 2004.

(51) Int. Cl.
*G05F 1/40* (2006.01)
(52) U.S. Cl. .................................... 323/285
(58) Field of Classification Search ............... 323/246, 323/268, 282, 285; 363/15, 16, 78, 79
See application file for complete search history.

(56) References Cited

U.S. PATENT DOCUMENTS

| | | | | |
|---|---|---|---|---|
| 5,572,416 A | * | 11/1996 | Jacobs et al. | 363/89 |
| 6,657,419 B2 | * | 12/2003 | Renyolds | 323/285 |
| 7,157,888 B2 | * | 1/2007 | Chen et al. | 323/224 |
| 7,265,524 B2 | * | 9/2007 | Jordan et al. | 323/225 |
| 7,279,878 B2 | * | 10/2007 | Ootani et al. | 323/285 |

* cited by examiner

*Primary Examiner*—Adolf Berhane
(74) *Attorney, Agent, or Firm*—Jeffrey D. May; Weiss & Moy, P.C.

(57) ABSTRACT

A circuit and a method for controlling output current of cascaded switching power converters having a buck type output stage are disclosed. The circuit comprises two comparators for sensing input and output current, a logic gate for processing the output states of the comparators, and a pulse width modulator circuit for receiving the output of the logic gate and for controlling a switching power converter in accordance with this output. The method comprises simultaneous monitoring current in the stages of the converter, comparing the currents to the corresponding reference levels, generating the corresponding error signals, and controlling a pulse-width modulator circuit of a switching converter in accordance with these error signals.

25 Claims, 5 Drawing Sheets

PRIOR ART

METHOD AND APPARATUS FOR CONTROLLING OUTPUT CURRENT OF A CASCADED DC/DC CONVERTER

RELATED APPLICATION

This application is related to U.S. Provisional Application Ser. No. 60/631,514, filed Nov. 29, 2004, in the name of the same inventors listed above, and entitled, "METHOD AND APPARATUS FOR CONTROLLING OUTPUT CURRENT OF A CASCADED DC/DC CONVERTER" The present patent application claims the benefit under 35 U.S.C. §119(e).

FIELD OF THE INVENTION

The present invention relates generally to power supplies, and more specifically to a method and apparatus for controlling switching power converters powering light emitting diodes (LED) and other current-fed devices.

BACKGROUND OF THE INVENTION

Development of high brightness light emitting diodes (HB-LED) in recent years has created a demand for a new class of power sources—LED drivers. The present applications of HB-LEDs include, but are not limited to: traffic signals, decorative lighting, automotive lighting (head and tail lights), etc. The LED driver is expected to supply a constant current with low ripple, and to operate from a wide range of input voltages. Many of these applications do not require galvanic isolation of the LEDs from the input. However, many applications require the driver to step its output voltage either up or down depending on the input voltage. Some applications, like automobiles, require the LED driver to meet stringent conducted and radiated EMI standards. Cascaded DC-DC converter topologies (Cuk, SEPIC) have been considered for this applications in the industry due to their low input EMI and the ability to step the input voltage either up or down.

Another example of cascaded converter topologies is a class of so-called "quadratic" converters that can operate with a wide dynamic range of input voltages and achieve large step-down ratios. These topologies are particularly useful for powering low-voltage devices directly from the 110/220VAC line. Cascaded converters having a buck output stage are the most desirable kind for driving HB LEDs due to the ease of controlling their output current and implementation of PWM dimming. However, conventional control methods when applied to cascaded converter topologies suffer start-up and transient performance problems due to lack of control over the input stage current.

Thus, an improved method and apparatus for controlling the output current of cascaded converters having a buck output stage is needed to achieve rugged performance, stability and fast PWM dimming control of the output current.

SUMMARY OF THE INVENTION

A power converter circuit has input terminals for receiving input power. Output terminals for delivering constant current are coupled to a load. A cascaded power converter is coupled to the input and output terminals. The cascaded power converter has an input stage; an output stage, the output stage being of a buck type comprising an output filter inductor for smoothing current in the load; a first current sensor coupled to the input stage for monitoring current in the input stage; a second current sensor coupled to the output stage for monitoring current in the output filter inductor; a first reference; a second reference; a first comparator circuit coupled to the first current sensor and the first reference; a second comparator circuit coupled to the second current sensor and the second reference; and a pulse width modulator circuit. A controlled switching circuit is provided for coupling an input of the input stage to the input terminals and for coupling an output of the input stage to an input of said output stage. The first comparator changes an output state when output of the first current sensor exceeds the first reference. The second comparator changes an output state when output of the second current sensor exceeds the second reference. The pulse width modulator circuit controls the controlled switching circuit based on output states of the first and second comparators.

A method for controlling cascaded switching power converters having an input stage, an output buck stage and a controlled switching circuit is disclosed. The method comprises: sensing a first current in the input stage; sensing a second current in the output stage; comparing the first current to a first reference and generating a first signal; comparing the second current to a second reference and generating a second signal; and controlling the switching circuit as a function of the first signal and the second signal.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, as well as a preferred mode of use, and advantages thereof, will best be understood by reference to the following detailed description of illustrated embodiments when read in conjunction with the accompanying drawings, wherein like reference numerals and symbols represent like elements.

DESCRIPTION OF PREFFERED EMBODIMENT

A buck converter is a basic single-inductor DC/DC converter topology characterized by a step-down voltage transfer ratio. The buck converter is useful for driving light emitting diodes due to its continuous output current. Controlling a buck LED driver can be reduced to merely open-loop control of peak current in the inductor. Easy implementation of PWM dimming is another attractive feature of an open-loop controlled buck converter. Simply switching its control circuit on and off at a few hundred Hertz provides PWM dimming of the LED lamp without subjecting it to any current overshoots, and achieves a wide dynamic range of PWM dimming.

However, buck converters have several disadvantages. The disadvantages of the buck converter include: step-down only DC transfer ratio, high input current ripple, poor control over output current when operating with a large step-down ratio, poor input power factor when utilized as an AC/DC converter for offline LED driving.

Cascaded converters having a passive output buck stage can be used to alleviate most of the above drawbacks of the buck topology. These cascaded topologies include fourth order converters (Cuk, Zeta), "quadratic" topologies (double-buck, buckboost-buck) and single-stage PFC converters (multiconverter, BIBRED etc.). However, open-loop control of the output current of these power converters is challenging due to transient and stability problems caused by luck of control over the input power converter stage.

The present invention provides: novel circuits and methods for controlling cascaded converters having a buck type output stage. As a result, stable and failure-safe operation of the LED driver can be achieved. A broad range of the input and output specifications can be covered by incorporating one or more aspects of the present invention. The present invention includes, alone or in combination, a unique dual current sensing method for simultaneous controlling currents of the converter stages.

Figure 1:
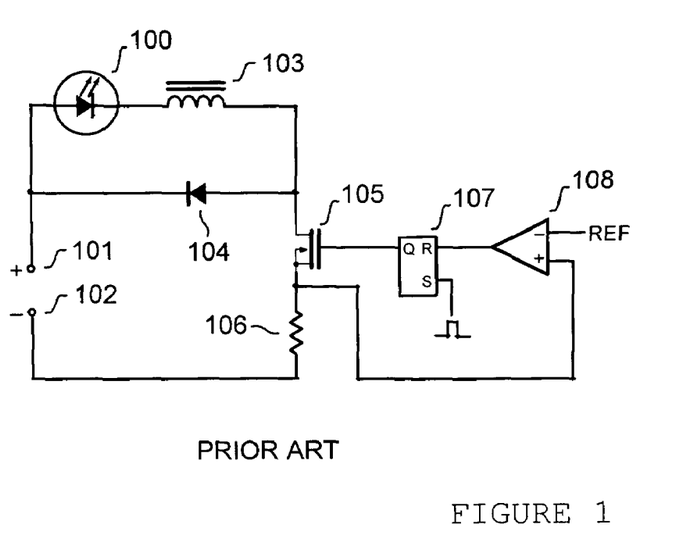
FIG. 1 is a schematic diagram depicting a prior art open-loop controlled buck LED driver circuit.

Referring to FIG. 1, a prior art LED driver circuit of the buck converter type is depicted. The circuit comprises input terminals 101 and 102 for receiving an input DC voltage, a light emitting diode (LED) 100 connected in series with a filter inductor 103, a controlled switching device 105, a sink diode 104, a current sense resistor 106, a current sense comparator 108 and a PWM latch 107.

The latch 107 periodically activates the switch 105 coupling the series connected inductor 103 and LED 100 across the input terminals 101, 102. The inductor 103 is repeatedly energizing from the input. The diode 104 is reverse biased when the switch 105 is active. The inductor current develops voltage across the current sense resistor 106. When the voltage across the current sense resistor 106 exceeds the reference voltage (REF) of the comparator 108, the latch 107 resets, deactivating the switch 105. The current of the inductor 103 then finds its way via the forward-biased diode 104. While being a simple way of driving LEDs, the above control method cannot be directly applied to cascaded converters. In these converters, the controlled switching device conducts a superposition of the input and the output inductor currents.

Figure 2:
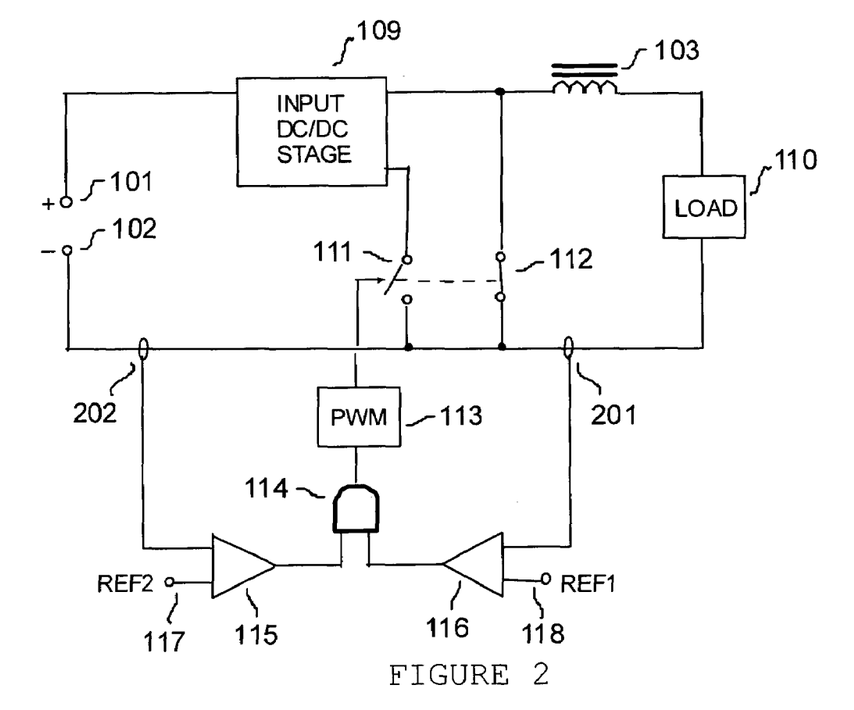
FIG. 2 is a block diagram illustrating the embodiment of the present invention by depicting a generalized control scheme of a two-stage converter having an output buck stage.

FIG. 2 shows a simplified block diagram generalizing the embodiments of the present invention. The circuit includes input terminals 101 and 102 for receiving input DC or rectified AC voltage, an output load 110, an input DC/DC stage 109, an output buck DC/DC stage and a control circuit. The buck stage comprises output filter inductor 103, controlled switch 111 and controlled or uncontrolled sink switch 112. Both the input stage 109 and the buck stage share common switches 111 and/or 112. The control circuit includes an input current sensor 202, an output current sensor 201, an input current comparator 115, an output current comparator 116, an input current reference 117, an output current reference 118, an 'AND' (or 'NAND') gate circuit 114 and a pulse width modulator (PWM) circuit 113. In operation, the logic states of the comparators 115 and 116 depend on whether either of the current sensor 201 and 202 detect current exceeding or falling below the corresponding reference levels 117 and 118. The state of the PWM circuit 113 controlling the switches 111 and 112 is a function of the output states of the comparator 115 and 116. The switches 111 and 112 operate out of phase, i.e. the switch 112 becomes non-conductive once the switch 111 turns on, and vise-versa.

Upon the first application of power to the input terminals 101 and 102 of the circuit of FIG. 2, there is no current in the output filter inductor 103. While the inductor 103 is developing the output current, the state of the PWM circuit 113 is controlled by the state of the comparator 115 alone. The switch 111 turns off as soon as the signal from the sensor 202 exceeds the reference level 117, thereby controlling the input current. In some embodiments of the present invention, the PWM circuit 113 turns the switch 111 on upon the output current signal from the sensor 202 falling below the reference 117. In other embodiments, the turn-on moment of the switch 111 is independent of the state of the comparator 115.

In steady-state operation of the circuit of FIG. 2, the input current sensor 202 is assumed not to produce a current sense signal that exceeds the reference level 117 of the comparator 115. Therefore, the switching state of the switch 112 will depend on the output state of the comparator 116 only. The PWM circuit 113 turns the switch 111 off upon the instantaneous signal level of the current sensor 201 exceeding the reference 118, thereby controlling the load 110 current. At the same time, the switch 112 connects the inductor 103 across the load 110. In some embodiments of the present invention, the PWM circuit turns the switch 111 on upon the output current signal 201 falling below the reference 118. In other embodiments, the turn-on moment of the switch 111 is independent of the state of the comparator 116. The switch 112 is switched off the switch 111 is conducting.

A transitional mode of operation of the circuit of FIG. 2 may exist in some embodiments, wherein the switch 111 turn-off occurs upon the output current signal 201 exceeding the reference 118 level, and wherein the switch 111 turn-on happens when the input current signal 202 falls below the reference level 117. This transitional mode can occur directly before the circuit enters its steady state operation, as well as during input or output transients.

Figure 3:
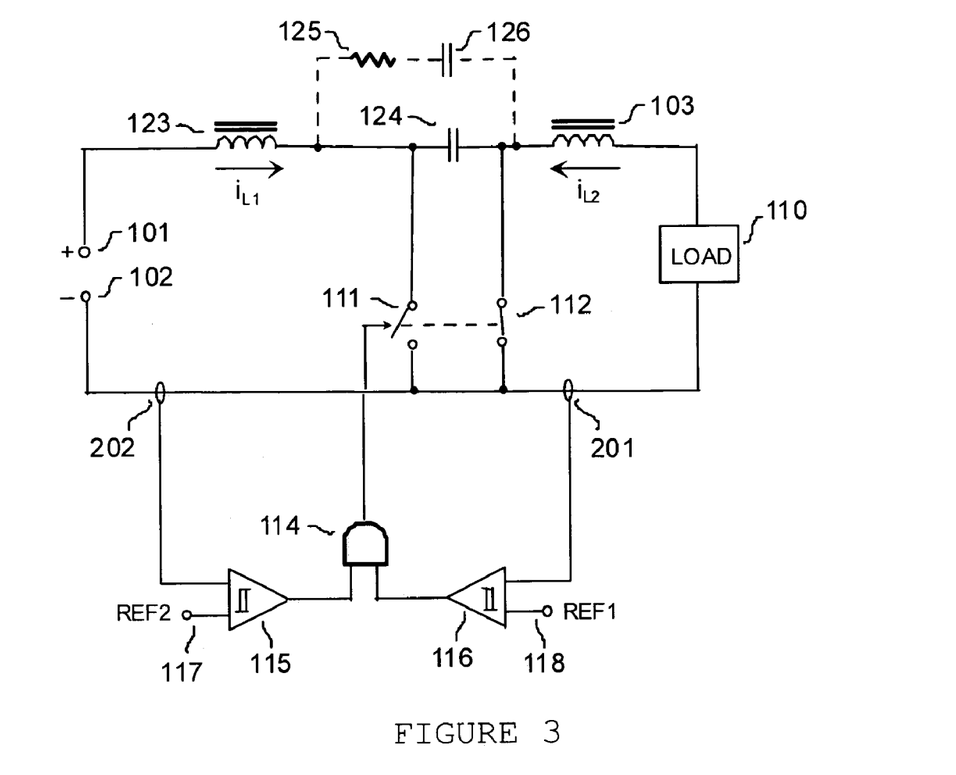
FIG. 3 depicts one implementation of the control scheme of FIG. 2 using hysteretic input and output current control of a boost-buck (Cuk) converter.

The circuit diagram of FIG. 3 depicts the first embodiment of the present invention. The circuit includes input terminals 101 and 102 for receiving input voltage, an output load 110, a cascaded boost-buck DC-DC converter, commonly referred to as a Cuk converter, and a control circuit for controlling the output current of the DC-DC converter. The DC-DC converter comprises an input boost inductor 123, an output filter inductor 103, an inter-stage coupling capacitor 124, a controlled switching device 111, a controlled or uncontrolled sink switching device 112. The DC-DC converter may also include a damping circuit consisting of a resistor 125 and a capacitor 126. The control circuit includes an input current sensor 202, an output current sensor 201, an input current comparator 115, an output current comparator 116, an input current reference 117, an output current reference 118 and an 'AND' gate circuit 114.

Figure 4:
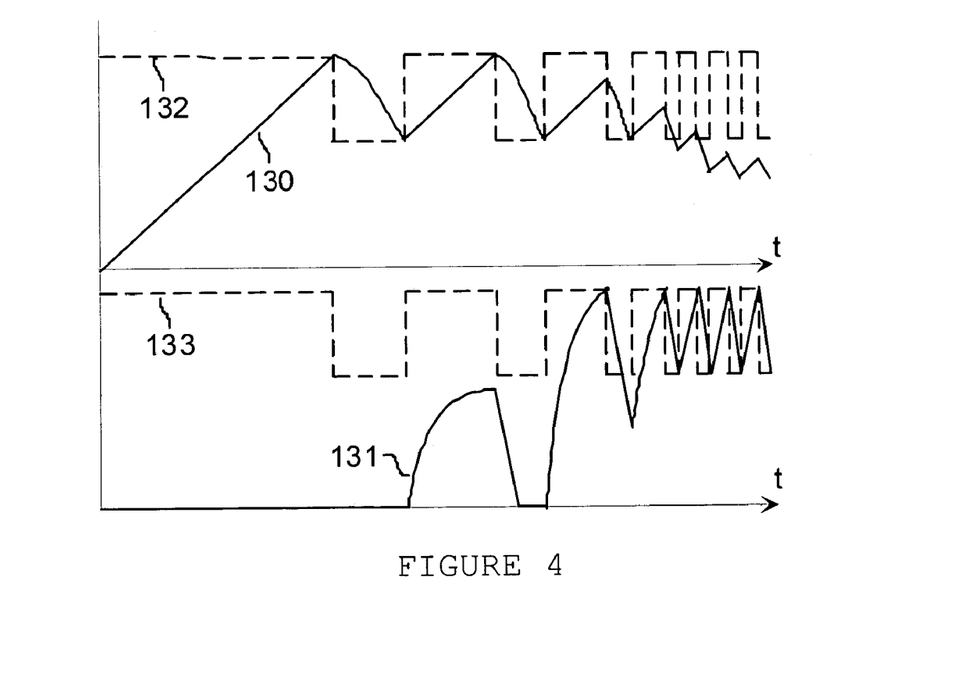
FIG. 4 shows the waveforms explaining the operation principle of the circuit of FIG. 3.

Operation of the circuit of FIG. 3 is illustrated by the waveforms of FIG. 4. The waveforms 132 and 133 represent the input current reference levels 117 and the output current reference level 118 respectively. Each reference is switched between a higher state, when the switch 111 is on, and a lower state, when the switch 111 is off. The waveform 130 depicts the input current ($I_{L1}$) signal from the sensor 202. The output current ($I_{L2}$) signal is represented by the waveform 131. (The $I_{L1}$ and $I_{L2}$ waveforms are shown for the case of an LED load 110 having forward voltage greater than the voltage at the input terminals 101, 102. This case is given as an example only and not in the limiting sense.)

Referring to FIGS. 3 and 4, both $I_{L1}$ and $I_{L2}$ equal zero initially. Therefore, the comparator 115 and 116 outputs are high. The switch 111 turns on, and the input voltage is applied across the inductor 123 giving linear rise to the input current $I_{L1}$. Since the capacitor 124 is charged to a voltage, which is lower than the forward voltage of the LED load 110, the current $I_{L2}$ remains at zero. Once the current $I_{L1}$ exceeds the reference level 117, the state of the comparator 115 becomes low, and the switch 111 turns off. At the same time, the reference levels 117 and 118 change to their low states. The current $i_{L1}$ begins charging the capacitor 124 via the switch 112. The switch 111 turns on again when the current $i_{L1}$ falls below the reference level 117. The cycles repeat until the capacitor 124 voltage exceeds the forward voltage of the LED load 110. When this occurs, the current $i_{L2}$ starts rising. The current $I_{L2}$ ramps down during the off-states of the switch 111. It may take several cycles of the switch 111, until the current $i_{L2}$ exceeds the reference 118. At that moment, the state of the comparator 116 becomes low, and the on-cycle of the switch 111 terminates before the current $i_{L1}$ reaches its reference level 117. While the current $i_{L1}$ remains above the lower state of the reference 117, a transitional mode of operation can be observed. During this transitional mode, the switch 111 turns on upon the current $i_{L1}$ falling below the reference 117, whereas the turn-off of the switch 111 occurs when the current $i_{L2}$ exceeds the reference 118. After several cycles, the current $i_{L1}$ eventually falls below the reference 117, the voltage across the capacitor 124 settles, and the DC/DC converter enters its steady-state operation.

During the steady-state mode of operation, the state of the comparator 115 remains high, and the output current $I_{L2}$ cycles between the two levels defined by the upper and lower states of the reference 118. For most practical cases, in order to achieve stability of the circuit of FIG. 3 in the steady-state mode of operation, addition of the damping circuit consisting of the capacitor 126 and a resistor 125 is required.

In some cases, the down slope of the current $i_{L2}$ is not easily accessible. In these cases, the second embodiment of the present invention can be used, wherein the off-time of the controlled switching device is maintained constant. An example of the second embodiment is given in FIG. 5. The circuit includes input terminals 101 and 102 for receiving input voltage, an output load 110, a DC-DC converter, representing a transformer-isolated version of the Cuk converter of FIG. 3, and a control circuit for controlling the output current of the DC-DC converter. The DC-DC converter comprises an input boost inductor 123, an output filter inductor 103, inter-stage coupling capacitors 124 and 127, a power transformer 128, a controlled switching device 111, a controlled or uncontrolled sink switching device 112. The control circuit includes an input current sensor 202, an output current sensor 201, an input current comparator 115, an output current comparator 116, an input current reference 117, an output current reference 118, a 'NAND' gate circuit 114, a PWM latch 129 and an OFF-time delay circuit 134.

Figure 5:
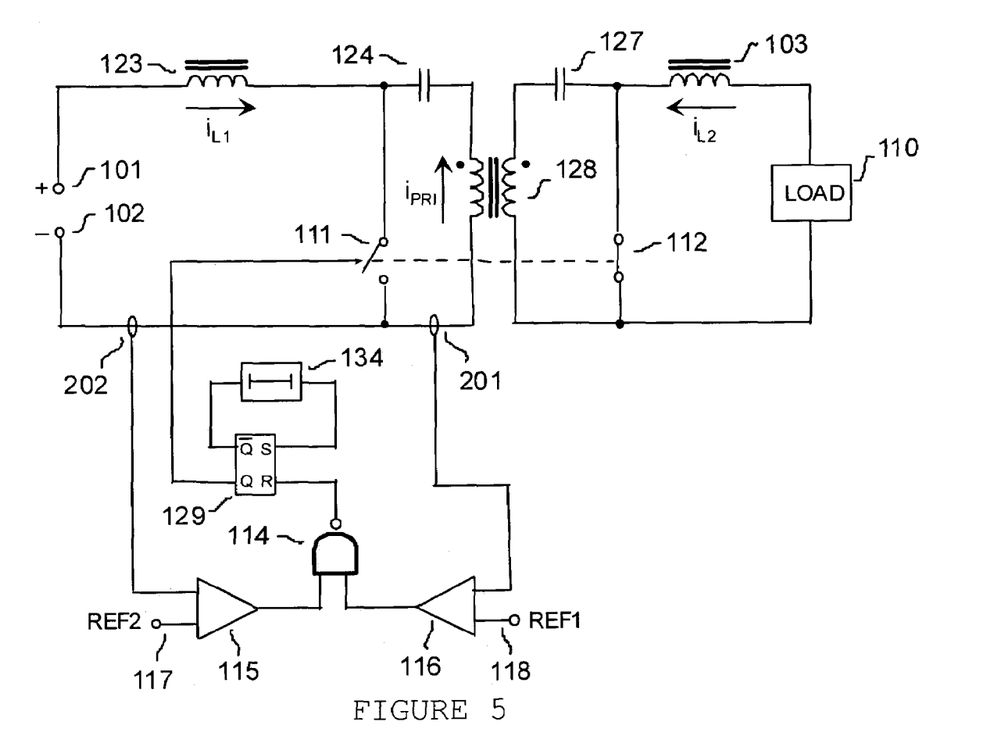
FIG. 5 depicts another implementation of the control scheme of FIG. 2 employing constant OFF-time control of the switching means applied to a transformer isolated Cuk converter.
Figure 6:
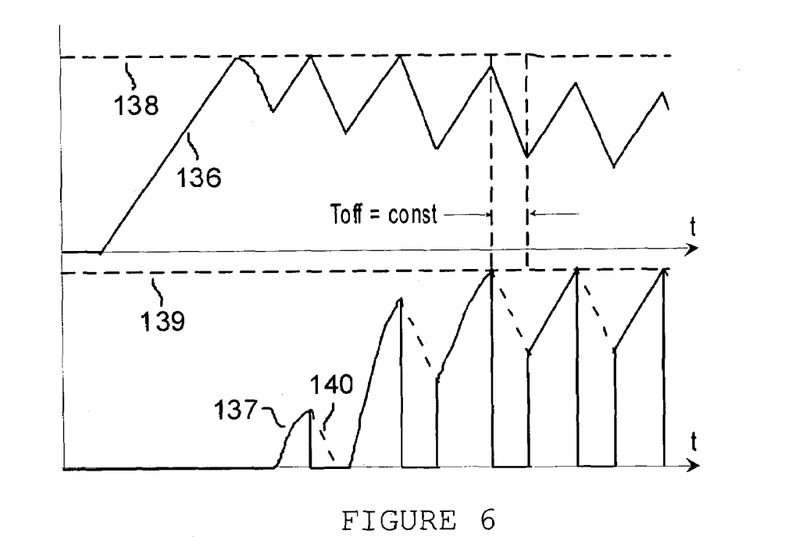
FIG. 6 shows the waveforms explaining the operation principle of the circuit of FIG. 5.

FIG. 6 shows the waveforms explaining the operation of the circuit of FIG. 5. The waveforms 138 and 139 represent the input current reference levels 117 and the output current reference level 118 correspondingly. The input boost inductor current $i_{L1}$ is represented by the waveform 136. The primary winding current $i_{PRI}$ of the transformer 128 is given by the waveform 137. The dotted line 140 represents the down slope of the current $I_{L2}$ in the output filter inductor 103. (The waveforms are shown for the case of an LED load 110 having forward voltage greater than the voltage at the input terminals 101, 102. (The turn ratio of the transformer 128 is assumed to be one-to-one. The magnetization current in the transformer 128 has been neglected. This case is given as an example only and not in the limiting sense.)

Referring to FIGS. 5 and 6, $I_{L1}$ and $I_{PRI}$ equal zero initially. Therefore, the comparator 115 and 116 outputs are high. The 'NAND' gate 114 outputs a logic low. The non-inverting output of the PWM latch 129 is low, while its inverting output is high. The delay circuit 134 begins its timing cycle. Once the delay 134 is over, the PWM latch is set, and the switch 111 turns on. The input voltage is applied across the inductor 123 giving linear rise to the input current $I_{L1}$. The capacitor 124 is charged to the input voltage, which is lower than the forward voltage of the LED load 110. The capacitor 127 is fully discharged. Therefore, the current $I_{PRI}$ remains at zero. Once the current $I_{L1}$ exceeds the reference level 117, the state of the comparator 115 becomes low, the PWM latch resets, and the switch 111 turns off. The current $i_{L1}$ begins charging the capacitors 124 and 127 effectively connected in series via the transformer 128 and the switch 112. The switch 111 turns on again after a fixed off-time delay determined by the delay circuit 134. The cycles repeat until the total voltage across capacitors 124 and 127 exceeds the forward voltage of the LED load 110. When this occurs, the current $i_{L2}$ starts rising. The current $I_{L2}$ ramps down during the off-states of the switch 111, as the inductor 103 becomes connected across the output load 110 through the switch 112. It may take several cycles of the switch 111, until the current $i_{PRI}$, which is the primary side reflected current of $i_{L2}$, exceeds the reference 118. At that moment, the state of the comparator 116 becomes low, and the on-cycle of the switch 111 terminates before the current $i_{L1}$ reaches its reference level 117. The time Toff of the switch 111 is still determined by the delay circuit 134 and, therefore, is maintained constant. Once the voltage across capacitors 124 and 127 settles, the circuit of FIG. 5 enters its steady-state mode of operation. The state of the comparator 115 remains high in the steady-state mode.

The first two specific embodiments represent free-running DC-DC converters operating at variable switching frequency. In many cases, fixed frequency of operation is desired due to the electro-magnetic interference (EMI) concerns.

Figure 7:
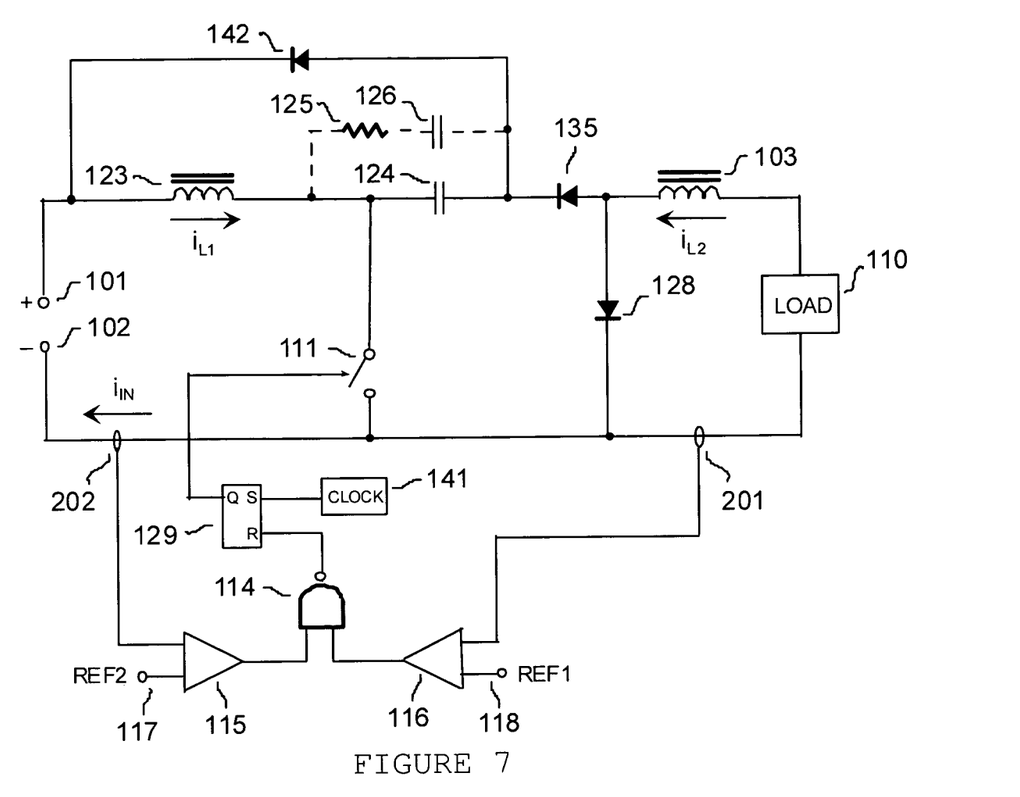
FIG. 7 depicts yet another implementation of the control scheme of FIG. 2 employing control of the switching means with constant switching frequency applied to a cascaded "quadratic" converter topology.

FIG. 7 shows a fixed frequency embodiment of the present invention. An example of a so-called "quadratic" converter is used to explain the operating principles of this embodiment of the present invention. The circuit of FIG. 7 includes input terminals 101 and 102 for receiving input voltage, an output load 110, a quadratic DC-DC converter and a control circuit for controlling the output current of the DC-DC converter. The DC-DC converter includes an input buck-boost stage followed by an output buck stage. The buck-boost stage comprises an input inductor 123, a flyback rectifier diode 142 and an inter-stage coupling capacitor 124. The output buck stage includes an output inductor 103, a control rectifier diode 135 and a sink rectifier diode 128. Both stages share a common controlled switch 111. Addition of a damping circuit consisting of a resistor 125 and a capacitor 126 may be required for stability. The control circuit includes an input current sensor 202, an output current sensor 201, an input current comparator 115, an output current comparator 116, an input current reference 117, an output current reference 118, a 'NAND' gate circuit 114, a PWM latch 129 and an oscillator circuit 141.

Figure 8:
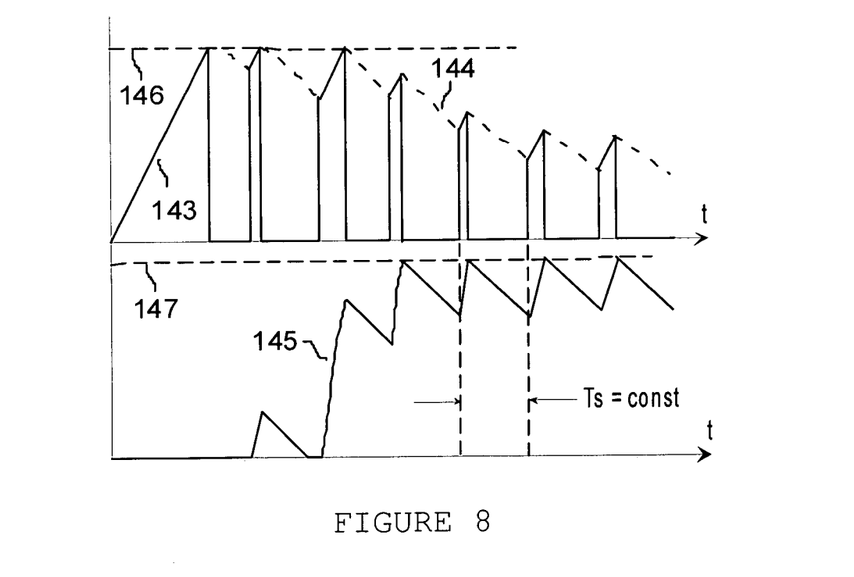
FIG. 8 shows the waveforms explaining the operation principle of the circuit of FIG. 7.

FIG. 8 shows the waveforms explaining the operation of the circuit of FIG. 7. The waveforms 146 and 147 represent the input current reference levels 117 and the output current reference level 118 correspondingly. The input buck-boost inductor current $i_{L1}$ is represented by the dotted line 144. The input current $i_{IN}$ is given by the waveform 145, coinciding with the rising portions of the current $I_{L1}$. The waveform 145 represents the current $I_{L2}$ in the output filter inductor 103. Referring to FIGS. 7 and 8, $I_{IN}$ and $I_{L2}$ equal zero initially. Therefore, the comparator 115 and 116 outputs are high. The 'NAND' gate 114 outputs a logic low. The output of the PWM latch 129 is low initially. The oscillator circuit begins generating clock pulses setting the PWM latch at a constant frequency rate. Once the PWM latch sets, the switch 111 turns on. The input voltage is applied across the inductor 123 giving linear rise to the input current $I_{L1}$. The capacitor 124 is fully discharged initially. Therefore, the current $I_{L2}$ remains at zero. Once the current $I_{IN}$ exceeds the reference level 117, the state of the comparator 115 becomes low, the PWM latch resets, and the switch 111 turns off. The current $i_{L1}$ finds its path through the flyback diode 142 charging the capacitor 124. The switch 111 turns on again upon the PWM circuit 129 receiving the next clock pulse from the oscillator 141. The cycles repeat until the voltage across the capacitor 124 exceeds the forward voltage of the LED load 110. When this occurs, the difference of the two voltages is applied across the inductor 103 through the switch 111 and the forward-biased diode 135. The current $i_{L2}$ starts rising. The current $I_{L2}$ ramps down during the off-states of the switch 111, as the inductor 103 becomes connected across the output load 110 through the diode 128. It may take several cycles of the switch 111, until the current $i_{L2}$ exceeds the reference 118. At that moment, the state of the comparator 116 becomes low, and the on-cycle of the switch 111 terminates before the current $i_{IN}$ reaches its reference level 117. Once the voltage across the capacitors 124 settles, the circuit of FIG. 7 enters its steady-state mode of operation. The state of the comparator 115 remains high in the steady-state mode.

Figure 9:
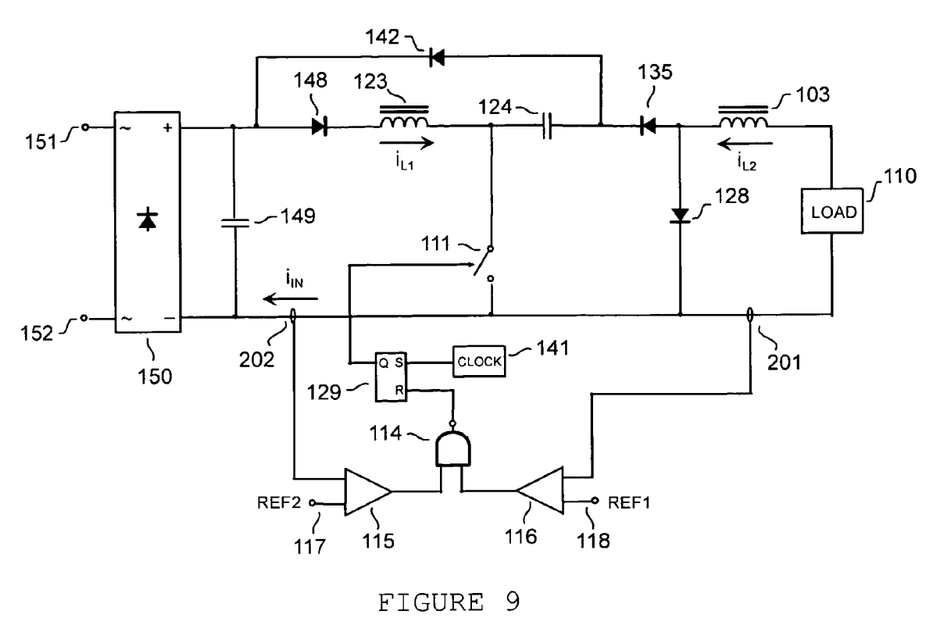
FIG. 9 shows the control scheme of FIG. 2 applied to a power factor corrected (PFC) cascaded converter topology ("multiconverter").

The circuits of FIGS. 3, 5 and 7 were described above assuming continuous conduction mode (CCM) of the inductor 123 rather as an example than in the limiting sense. Operating these circuits with the discontinuous conduction mode (DCM) of the inductor 123 is sometimes desired for improved stability. This mode of operation is also used in AC/DC power supplies to reduce harmonic distortion of the input AC current. In the latter case, the cascaded converters can be used as high-quality rectifiers by merely adding a blocking diode in series with the inductor 123 and selecting the capacitor 124 large enough to attenuate the rectified AC line ripple. An example of such high-quality rectifier is shown in FIG. 9. This circuit previously proposed in U.S. Pat. No. 6,781,351 is referred to as a "multiconverter".

The embodiment of the present invention illustrated by FIG. 9 includes all functional elements of the circuit of FIG. 7. In addition, the circuit of FIG. 9 includes input terminals 151 and 152 for receiving the input AC line voltage, a full-wave rectifier circuit 150, an input filter capacitor 149 for smoothing the high-frequency switching current $i_{IN}$ and a rectifier diode 148 for blocking reverse current $i_{L1}$ and maintaining DCM of the inductor L1.

Figure 10:
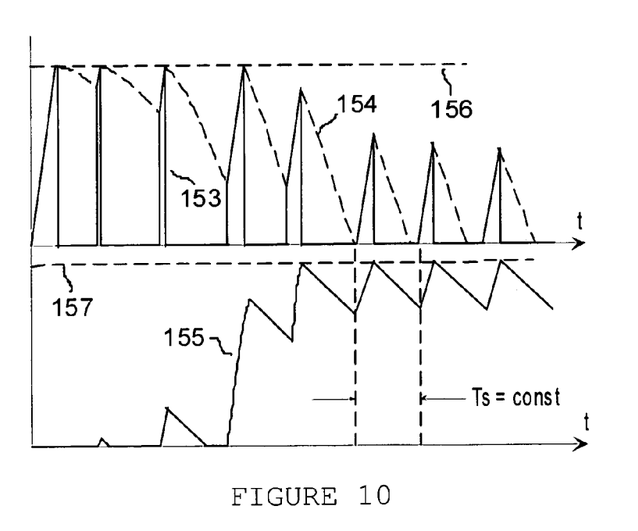

FIG. 10 shows the waveforms explaining the operation of the circuit of FIG. 9. The waveforms 156 and 157 represent the input current reference levels 117 and the output current reference level 118 correspondingly. The input buck-boost inductor current $i_{L1}$ is represented by the dotted line 154. The input current $i_{IN}$ is given by the waveform 155, coinciding with the rising portions of the current $I_{L1}$. The waveform 155 represents the current $I_{L2}$ in the output filter inductor 103. Operation of the circuit of FIG. 9 is substantially similar to the one of FIG. 7. The fundamental difference lays in the steady-state operation mode, wherein the current $i_{L2}$ reaches zero every switching cycle of the switch 111. The diode 148 blocks the reverse current in the inductor 123 and prevents discharging the capacitor 124 back into the input. This operating mode is shown by the $I_{L2}$ waveform 155 of FIG. 10.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A power converter circuit comprising:
   input terminals for receiving input power;
   output terminals for delivering constant current to a load;
   a cascaded power converter coupled to the input and output terminals comprising:
      an input stage, the input stage having an input boost inductor;
      an output stage, the output stage being of a buck type comprising an output filter inductor for smoothing current in the load;
      at least one coupling capacitor coupled to coupled to the input boost inductor and to the output filter inductor;
      a first current sensor coupled to the input stage for monitoring current in the input stage;
      a second current sensor coupled to the output stage for monitoring current in the output filter inductor;
      a first reference current;
      a second reference current;
      a first comparator circuit coupled to the first current sensor and the first reference current;
      a second comparator circuit coupled to the second current sensor and the second reference current; and
      a pulse width modulator circuit;
   a controlled switching circuit for coupling an input of the input stage to the input terminals and for coupling an output of the input stage to an input of said output stage;
   wherein the first comparator changing an output state when output of the first current sensor exceeds the first reference;
   wherein the second comparator changing an output state when output of the second current sensor exceeds the second reference;
   wherein the pulse width modulator circuit controls the controlled switching circuit based on output states of the first and second comparators.

2. A power converter in accordance with claim 1 further comprising a damping circuit coupled to the input boost inductor and to the output filter inductor.

3. A power converter in accordance with claim 2 wherein the damping circuit comprises:
   a resistor attached to the input boost inductor; and
   a damping circuit capacitor attached to the output filter inductor.

4. A power converter in accordance with claim 1 further comprising a power transformer, wherein the at least one coupling capacitor comprises:
   a first coupling capacitor attached to the input boost inductor and to a first winding of the power transformer; and
   a second coupling capacitor attached to the output filter inductor and to a second winding of the power transformer.

5. A power converter in accordance with claim 1 wherein the controlled switching circuit comprises a single switching transistor for both coupling the input of the input stage to the input terminals and for coupling the output of the input stage to the input of the output stage.

6. A power converter in accordance with claim 1 wherein said pulse width modulator circuit further includes a logic gate for generating a logic output in accordance with the states of said first comparator and said second comparator.

7. A power converter in accordance with claim 6 wherein the logic gate performs Boolean multiplication of output states of the first comparator and the second comparator.

8. A power converter in accordance with claim 6 wherein the logic gate performs Boolean summation of output states of the first comparator and the second comparator.

9. A power converter in accordance with claim 6 wherein the first reference and the second reference vary levels depending on the output of the logic gate, and wherein the controlled switching circuit is switched off when the output of the logic gate is low, and wherein the controlled switching circuit is switched on when the output of the logic gate is low.

10. A power converter in accordance with claim 9 wherein the first reference is equal to one of a first level or a second level based on the output of the logic gate, and wherein the second reference is equal to one of a third level or a fourth level based on the output of the logic gate.

11. A power converter in accordance with claim 6 wherein levels of the first reference and the second reference are invariant of the output of the logic gate.

12. A power converter in accordance with claim 11, wherein the pulse width modulator further comprises a flip-flop circuit, wherein the switching state of the controlled switching circuit depends on an output state of said flip-flop circuit.

13. A power converter in accordance with claim 12, wherein the flip-flop circuit switching to a low output state upon one of the output of the first current sensor exceeding the first reference or said second current sensor output exceeding said second reference.

14. A power converter in accordance with claim 13 wherein the pulse width modulator further comprises a clock input, the flip-flop circuit switched to a high output state upon receiving a clock signal at the clock input.

15. A power converter in accordance with claim 14 wherein the pulse width modulator further comprises an oscillator circuit for generating the clock signal.

16. A power converter in accordance with claim 14 wherein the clock signal is constant-frequency.

17. A power converter in accordance with claim 14 wherein said clock signal is variable-frequency.

18. A power converter in accordance with claim 17 wherein the clock signal is generated after a constant delay following a turn-off transition of the controlled switching circuit.

19. A power converter in accordance with claim 1 wherein the cascaded power converter is a boost-buck (Cuk) converter.

20. A power converter in accordance with claim 1 wherein the cascaded power converter is a Zeta converter.

21. A power converter in accordance with claim 1 wherein the cascaded power converter is a "quadratic" converter comprising the input stage of a buck type.

22. A power converter in accordance with claim 1 wherein the cascaded power converter is a "quadratic" converter comprising the input stage of a buck-boost type.

23. A power converter in accordance with claim 1 wherein the cascaded power converter is an AC-to-DC converter, and wherein the input stage is operated in discontinuous conduction mode to achieve low harmonic distortion of input AC current of the AC-to-DC converter.

24. A power converter in accordance with claim 1 wherein the cascaded power converter further comprises a power transformer for achieving galvanic isolation between the input terminals and the output terminals.

25. A power converter in accordance with claim 1 wherein the first reference and the second reference are controlled externally to program the output current of the power converter.

* * * * *